(12) United States Patent
Bae

(10) Patent No.: US 10,075,606 B2
(45) Date of Patent: Sep. 11, 2018

(54) MANAGEMENT SERVER, METHOD OF MANAGING WORKFORM AND EXECUTION START CONDITION AND RECORDING MEDIUM

(75) Inventor: Hyun-jin Bae, Seoul (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 446 days.

(21) Appl. No.: 13/536,032

(22) Filed: Jun. 28, 2012

(65) Prior Publication Data

US 2013/0063772 A1  Mar. 14, 2013

(30) Foreign Application Priority Data

Sep. 9, 2011  (KR) .................. 10-2011-0092066

(51) Int. Cl.
*H04N 1/00* (2006.01)
*G06F 3/12* (2006.01)

(52) U.S. Cl.
CPC ....... *H04N 1/00949* (2013.01); *G06F 3/1204* (2013.01); *G06F 3/1205* (2013.01); *G06F 3/1275* (2013.01); *G06F 3/1288* (2013.01); *H04N 1/00222* (2013.01); *H04N 2201/0074* (2013.01); *H04N 2201/0094* (2013.01)

(58) Field of Classification Search
CPC combination set(s) only.
See application file for complete search history.

(56) References Cited

U.S. PATENT DOCUMENTS

| 9,727,280 | B2 * | 8/2017 | Choi | G06F 3/1205 |
| 2008/0010369 | A1 * | 1/2008 | Hwang | G06F 17/30893 709/223 |
| 2008/0016520 | A1 * | 1/2008 | Kong | G06F 9/44526 719/329 |
| 2008/0256429 | A1 * | 10/2008 | Penner | G06F 17/248 715/200 |
| 2009/0144758 | A1 * | 6/2009 | Murakawa | G06F 9/4443 719/328 |
| 2009/0158281 | A1 * | 6/2009 | Omori | G06F 9/5038 718/101 |
| 2010/0281358 | A1 * | 11/2010 | Hwang | G06F 17/30893 715/234 |

(Continued)

FOREIGN PATENT DOCUMENTS

| KR | 10-2008-0006398 | 1/2008 |
| KR | 10-2011-0024156 | 3/2011 |
| WO | WO 0111509 A2 * | 2/2001 ............. G06Q 10/10 |

OTHER PUBLICATIONS

Korean Office Action dated Aug. 17, 2017 in corresponding Korean Patent Application No. 10-2011-0092066.

*Primary Examiner* — Barbara Reinier
(74) *Attorney, Agent, or Firm* — Staas & Halsey LLP

(57) ABSTRACT

A management server is provided. The management server includes a user interface to receive an input of a plug-in corresponding to a job of an image forming apparatus to generate a workform, which defines a job performing order of the image forming apparatus, and to receive an input of an execution start condition of the plug-in, a workform generator to generate a workform based on the input plug-in and the execution start condition, and a communication interface to transmit the generated workform to the image forming apparatus.

15 Claims, 14 Drawing Sheets

(56) References Cited

U.S. PATENT DOCUMENTS

| | | | |
|---|---|---|---|
| 2011/0007356 A1* | 1/2011 | Matsuura | H04N 1/00222 |
| | | | 358/1.15 |
| 2011/0055689 A1* | 3/2011 | Chang et al. | 715/255 |
| 2011/0055832 A1* | 3/2011 | Choi | G06F 3/1205 |
| | | | 718/100 |
| 2011/0299111 A1* | 12/2011 | Hasegawa | 358/1.15 |
| 2013/0169987 A1* | 7/2013 | Akiyama | G06F 9/44505 |
| | | | 358/1.13 |

* cited by examiner

FIG. 7

| SmarThru Workflow--Web Page Dialog Box | ✕ |

■ Database
Execution Start Condition: [Add Condition]

CONDITION1: [ScanMetadata_Work] [==▼] [Finish Work] Value: [ ] [+][−]

[AND ▼]

CONDITION2: [SourceFile data] [in ▼] [Product Release Register] Value: [Sales] [+][−]

[OR ▼]

[SourceFile data] [in ▼] [Application Form] Value: [Join] [+][−]

■ Database &Table    ■ Column

| | Column name | Column Type | Value | Binary Column | Unused |
|---|---|---|---|---|---|
| ▸ Condition2_Value | SID | int identity | [<>SDT] | ○ | ☑ |
| | Image | image | [<>SDT] | ● | ☐ |
| | description | varchar | [<>SDT] | ○ | ☐ |

[Help]　　　　　　　　[ClearAll] [Apply] [Cancel]

MANAGEMENT SERVER, METHOD OF MANAGING WORKFORM AND EXECUTION START CONDITION AND RECORDING MEDIUM

CROSS-REFERENCE TO RELATED APPLICATIONS

This application claims the benefit under 35 U.S.C. § 119 from Korean Patent Application No. 10-2011-0092066, filed on Sep. 9, 2011, in the Korean Intellectual Property Office, the disclosure of which is incorporated herein by reference in its entirety.

BACKGROUND OF THE INVENTION

1. Field of the Invention

The present general inventive concept generally relates to a management server, a method of managing a workform, and a recording medium, and more particularly, to a management server to manage a workform using a plug-in, a method of managing a workform, and a recording medium.

2. Description of the Related Art

An image forming apparatus refers to an apparatus that prints printing data, which is generated by a terminal apparatus such as a computer, on recording paper. Examples of such an image forming apparatus may be a copier, a printer, a facsimile machine, or a multifunction peripheral (MFP), which realizes the functions of the aforementioned devices in a single device.

Recently, if a workform, which defines a job to be performed in advance by organizing the job in a single workflow (such as a document sending solution), is executed in the image forming apparatus, the job is performed as it is set in the workform. Thus, the workform contributes to job automation and improvements in efficiency.

The workform allows a user or an administrator to define a job to be performed in advance using an edit tool.

In order to be applied in various work environments, the workform grasps a workflow condition of the job and makes the workflow branch according to the condition. That is, the conditions for making the workflow branch are separately defined as a script and the workflow is controlled by analyzing the workflow and the conditions while the job is performed.

However, if an administrator distributes such a workform uniformly, the administrator has a heavy load in generating a plurality of workforms for various workflows and allowing the workforms to be used.

Also, if the administrator distributes the workform uniformly, the user has difficulty in selecting a suitable workform for each job.

In order to solve the above problems, the administrator defines workflows for various situations in a single workform and writes a condition script so that the workflows branch automatically and thus the single workform is performed in various patterns.

However, in this case, if the workflow is changed or a new workflow is added, there is a problem in that the existing workform should be corrected and the condition script should be re-defined.

Also, as the workflow becomes diversified, the condition script becomes more complicated, and also, the administrator should have expertise in writing the condition script separately.

SUMMARY

The present general inventive concept provides a management server which sets an execution start condition in a plug-in of a specific function performing at least one function of a workflow, without using a complicated and difficult condition script, which may annoy an administrator, so that an administrator or a user can easily manage a workform, a method of managing a workform, and a recording medium.

Additional embodiments of the present general inventive concept will be set forth in part in the description which follows and, in part, will be obvious from the description, or may be learned by practice of the general inventive concept.

The foregoing and/or other features and utilities of the present general inventive concept may be achieved by providing a management server which is communicatively connectable to an image forming apparatus, the management server including a user interface to receive an input of a plug-in corresponding to a job of the image forming apparatus to generate a workform, which defines a job performing order of the image forming apparatus, and to receive an input of an execution start conditions for the plug-in, a workform generator to generate the workform based on the input plug-in and the execution start condition, and a communication interface to transmit the generated workform to the image forming apparatus.

The communication interface may receive execution information of the workform from the image forming apparatus to which the generated workform is transmitted, and the management server may further include a controller to perform a job corresponding to the generated workform based on the execution information of the workform.

The execution information may include at least one of information of the image forming apparatus, information of the generated workform performed by the image forming apparatus, and resulting information of a job performed by the image forming apparatus.

The controller may compare an execution start condition set for a plug-in within the generated workform and the received execution information, and may perform a job corresponding to the plug-in if the execution information is matched with the execution start condition.

The plug-in may be at least one of an input plug-in, a conversion plug-in, and a transmission plug-in.

The input plug-in may include at least one of a scan plug-in, a fax plug-in, an email plug-in, a folder plug-in, and a file transfer protocol (FTP) plug-in, the conversion plug-in may include an optical character recognition (OCR) plug-in, and the transmission plug-in may include at least one of an email plug-in, an FTP plug-in, a PCFAX plug-in, a folder plug-in, a printer plug-in, and a database plug-in.

The management server may further include a storage unit to store the generated workform.

The user interface may display a user interface window including a first region to display a plurality of plug-ins and a second region to display a plug-in selected from among the plurality of plug-ins.

The second region may hierarchically display the selected plug-in according to the selected order or the job performing order.

The user interface window may further include a third region to receive input of an execution start condition for the selected plug-in.

The foregoing and/or other features and utilities of the present general inventive concept may also be achieved by a method of managing workform of a management server which is communicatively connectable to an image forming apparatus, the method including: displaying a user interface window to receive an input of a plug-in corresponding to a job of the image forming apparatus to generate the workform, which defines a job performing order of the image forming apparatus, and to receive an input of an execution start condition of the plug-in, generating the workform based on the plug-in and the execution start condition received by the user interface window, and transmitting the generated workform to the image forming apparatus.

The method may further include receiving execution information of the workform from the image forming apparatus to which the generated workform is transmitted, and performing a job corresponding to the generated workform based on the execution information of the workform.

The execution information may include at least one of information of the image forming apparatus, information of a workform performed by the image forming apparatus, and resulting information of a job performed by the image forming apparatus.

The performing the job may include comparing an execution start condition set for a plug-in within the generated workform and the received execution information, and, if the execution information is matched with the execution start condition, performing a job corresponding to the plug-in.

The plug-in may be at least one of an input plug-in, a conversion plug-in, and a transmission plug-in.

The input plug-in may include at least one of a scan plug-in, a fax plug-in, an email plug-in, a folder plug-in, and an FTP plug-in, the conversion plug-in may include an OCR plug-in, and the transmission plug-in may include at least one of an email plug-in, an FTP plug-in, a PCFAX plug-in, a folder plug-in, a printer plug-in, and a database plug-in.

The user interface window may be displayed so as to include a first region to display a plurality of plug-ins and a second region to display a plug-in selected from among the plurality of plug-ins.

The second region may hierarchically display the selected plug-in according to the selected order or the job performing order.

The user interface window may further include a third region to receive input of an execution start condition for the selected plug-in.

The foregoing and/or other features and utilities of the present general inventive concept may also be achieved by a recording medium in which a program code to perform a method of managing a workform of a management server connectable to an image forming apparatus is stored, the method of managing the workform including displaying a user interface window to receive an input of a plug-in corresponding to a job of the image forming apparatus to generate the workform, which defines a job performing order of the image forming apparatus, and to receive input of an execution start condition for the plug-in, generating the workform based on the plug-in and the execution start condition received by the user interface window, and transmitting the generated workform to the image forming apparatus.

Exemplary embodiments of the present general inventive concept may also provide a method of generating a workform to control one or more operations of an image forming apparatus, the method including receiving a selection of a plug-in corresponding to a job to be performed by the image forming apparatus with an interface of a workform management server, receiving at least one execution start condition of the selected plug-in with the interface, and generating a workform according to the selected plug-in and the received at least one execution start condition.

Exemplary embodiments of the present general inventive concept may also provide a method of executing a workform to control one or more operations of an image forming apparatus, the method including receiving plug-in execution information of a plug-in with the image forming apparatus, the plug-in corresponding to a job to be performed by the image forming apparatus, determining whether the plug-in execution information is matched with an execution start condition, and performing the job corresponding to the plug-in when it is determined that the plug-in execution information is matched with an execution start condition.

The method may also include determining whether the plug-in is a lowest-order plug-in, and, when the plug-in not the lowest order plug-in, determining whether a second plug-in execution information is matched with the execution start condition, and performing the job corresponding to a second plug-in when it is determined that the second plug-in execution information is matched with the execution start condition.

BRIEF DESCRIPTION OF THE DRAWINGS

These and/or other embodiments of the present general inventive concept will become apparent and more readily appreciated from the following description of the embodiments, taken in conjunction with the accompanying drawings of which:

FIGS. 3 to 9 are views illustrating user interface windows to manage a workform according to exemplary embodiments of the present general inventive concept;

DETAILED DESCRIPTION OF THE PREFERRED EMBODIMENTS

Figure 1:
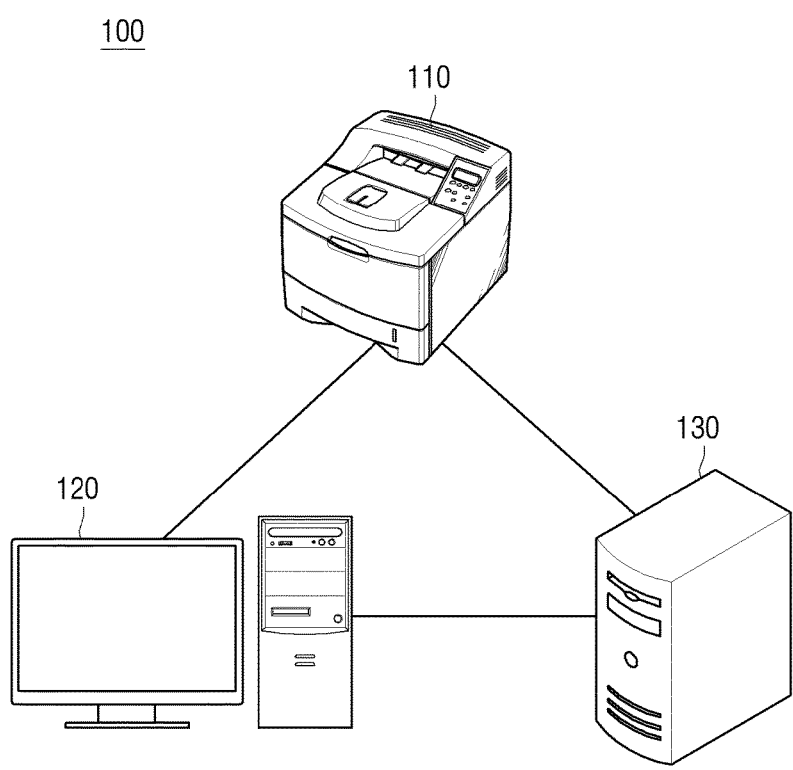
FIG. 1 is a view illustrating a workform management system according to exemplary embodiments of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a view illustrating a workform management system according to exemplary embodiments of the present general inventive concept. Referring to FIG. 1, a workform management system 100 can include an image forming apparatus 110, a user terminal apparatus 120, and a management server 130 which are communicatively connected to one another via a wired and/or wireless network. A plurality of terminal apparatuses 120 and a plurality of image forming apparatuses 110 may be provided, although one terminal apparatus 120 and one image forming apparatus 110 are illustrated in FIG. 1 for the convenience of explanation.

The image forming apparatus 110 can perform a workform generated by the user terminal apparatus 120 or the management server 130.

More specifically, the image forming apparatus 110 can receive a workform selected by a user from the management server 130 and can display the workform. For example, the user may select from one or more workforms provided by the management server 130 with the user terminal apparatus 120, where the one or more workforms may be displayed on the user terminal apparatus 120. The image forming apparatus 110 can be operated according to a workform selected from a list of workforms displayed by, for example, the user terminal 120.

The workform may include information to perform a job provided by the image forming apparatus 110. For example, the workform may include information such as a job prepared by the user, an apparatus to perform the job, a processing order of the job, a job condition, and a location to store resulting data of the job. If the stored workform is used, the user can perform the same job without repeating a setting operation.

Figure 3:
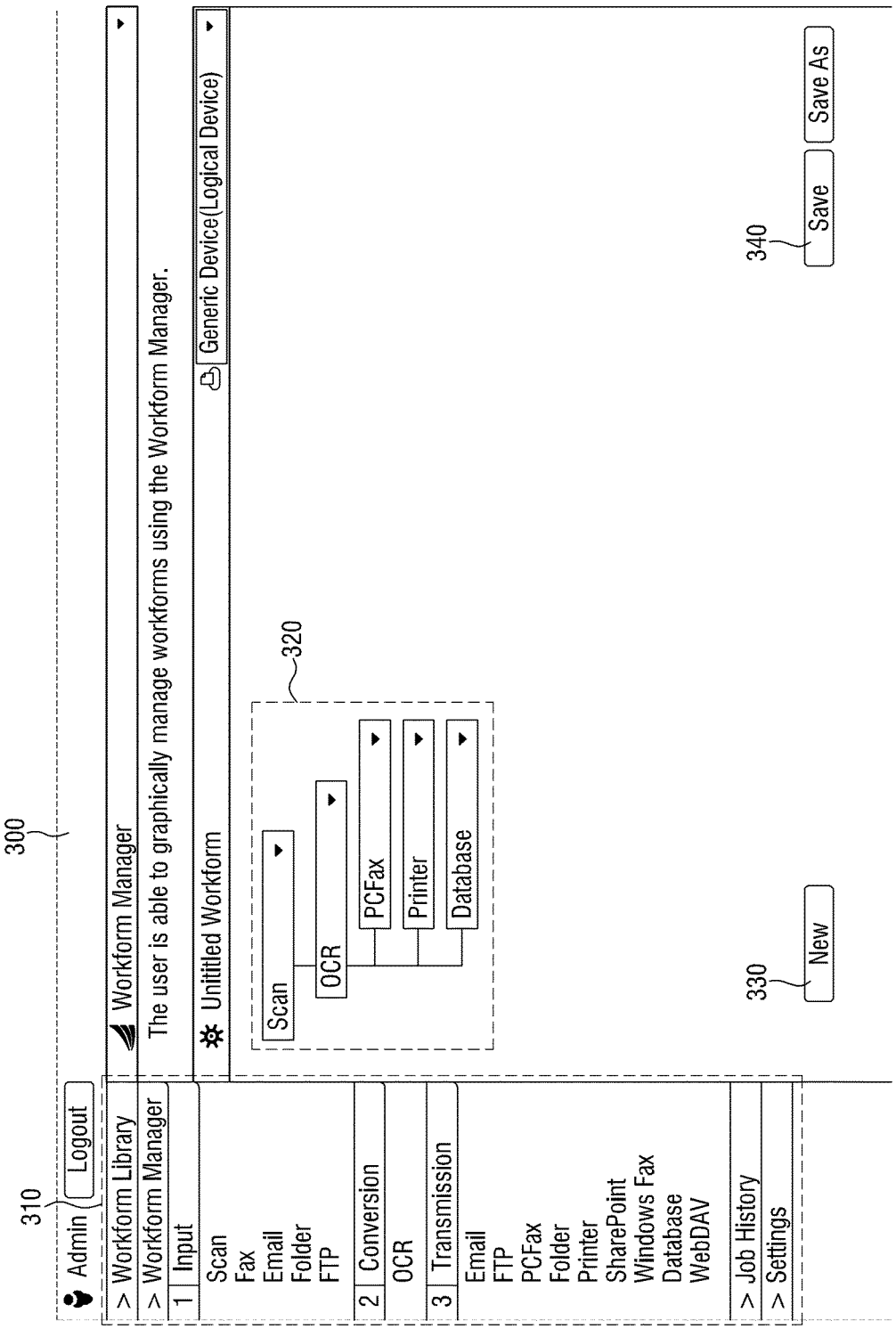
Figure 4:
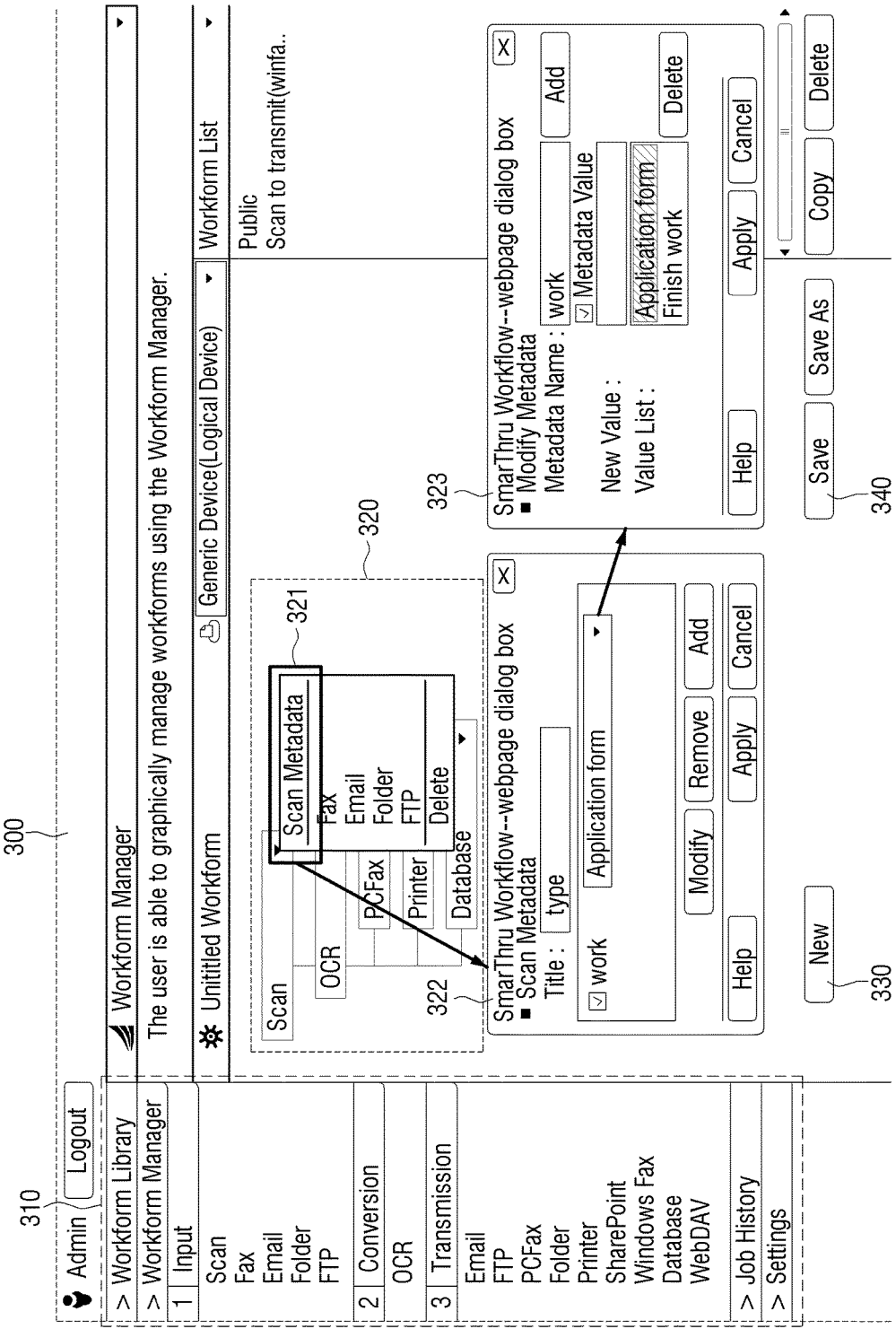

A general workform can include an input source to provide data and a destination to which the data is to be transmitted. For example, data to be processed may be a document to be scanned by a scanner. The input source may be a workform execution device to display a user interface window 300 (e.g., as illustrated in FIGS. 3 and 4) and to scan a document. The destination may be a file server, a file transfer protocol (FTP) server, or a simple mail transfer protocol (SMTP) server, to which the scanned document is transmitted.

The workform may be generated with a plug-in corresponding to each job. The plug-in may be a program (e.g., that is executable by a computer, such as the user terminal 120 or the management server 103, or by the image forming apparatus 110) that proceeds with an independent job and may be at least one of an input plug-in (for example, a scan plug-in or a fax plug-in), a conversion plug-in (for example, an optical character recognition (OCR) plug-in), and a transmission plug-in (for example, an email plug-in or an FTP plug-in).

The user may request the user terminal apparatus 120 or the management server 130 to prepare a workform and to perform a job. More specifically, if the user logs-in the management server 130 through the user terminal apparatus 120, the management server 130 may directly provide a graphic user interface (GUI) screen to generate a workform or may provide the GUI screen through the user terminal apparatus 120. The user may prepare a workform using a plug-in through the GUI screen.

Accordingly, the user can prepare the workform through the user terminal apparatus 120 and the prepared workform can be transmitted to the management server 130 and stored in the management server 130. The workform may be generated with a plug-in corresponding to each job. Although the user generates the workform through the user terminal apparatus 120 in FIG. 1, the workform may be directly generated through the management server 130.

If the user moves to the image forming apparatus 110 and requests transmission of the workform, the management server 130 can transmit the stored workform to the image forming apparatus 110. The image forming apparatus 110 may correct the received workform based on pre-stored function information (e.g., editing the printer information of the received workform according to the pre-stored function information of the image-forming apparatus, such as print resolution, conversion of received data to print data to be printed, etc.).

If the user selects a desired workform, the image forming apparatus 110 can transmit the selected workform to the management server 130. The management server 130 can receive data and perform a corresponding job according to the received workform.

The image forming apparatus 110 recited herein may be a multifunction peripheral, a printer, a facsimile machine, a scanner, or a copier.

The user terminal apparatus 120 may be a personal computer, a personal digital assistant (PDA), a tablet computer, a cellular phone or smartphone, or a laptop computer.

The management server 130 can store log-in information (e.g., identification (ID) and password) of pre-registered users and a plurality of workforms (e.g., workforms that are generated and/or set according to users), and can install a workform management solution to prepare a workform. The management server 130 may be a server computer and/or any suitable computer that is managed by an administrator but may be used by a general user.

Figure 2:
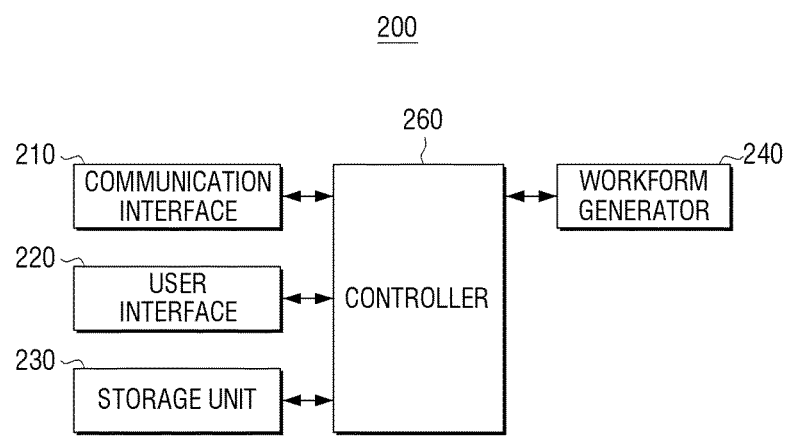
FIG. 2 is a block diagram illustrating a management server according to exemplary embodiments of the present general inventive concept.

FIG. 2 is a block diagram illustrating a management server according to exemplary embodiments of the present general inventive concept. Referring to FIG. 2, a management server 200 according to exemplary embodiments can include a communication interface 210, a user interface 220, a storage unit 230, a workform generator 240, and a controller 250.

The communication interface 210 can connect the management server 200 to the image forming apparatus 110 through a communication network (not illustrated).

More specifically, the communication interface 210 may transmit a workform generated in the management server 200 to the image forming apparatus 110. If a user selects a desired workform on the image forming apparatus 110, the communication interface 210 may receive execution information on the selected workform.

The execution information can include at least one of information of the image forming apparatus, information of a workform executed in the image forming apparatus, and resulting information of a job performed in the image forming apparatus, and/or any suitable information to carry out the exemplary embodiments of the present general inventive concept disclosed herein.

The information of the image forming apparatus can include information of a user executing a workform (e.g., information identifying the name of the user and/or the workform is selected to be executed), information on a time at which the workform is executed, and IP (Internet Protocol) information of the image forming apparatus in which the workform is executed.

The information of the workform executed in the image forming apparatus can include information on meta data, information on a time at which the workform is generated, information on a user who generates the workform, and information on a workform name, and/or any suitable information to carry out the exemplary embodiments of the present general inventive concept disclosed herein.

The resulting information of the job performed in the image forming apparatus can include information that is obtained from a previously executed plug-in (that is, information on a result of performing a job corresponding a plug-in within the workform using the image forming apparatus).

The communication interface 210 may transmit and/or receive data in a wireless or wired manner through a communications network such as a local area network (LAN) and/or the Internet, or may transmit and/or receive data through a universal serial bus (USB) port.

If the user generates a workform through the user terminal apparatus 120, the management server 200 may be connected to the user terminal apparatus 120 through a communication network (not illustrated).

The user interface 220 may receive input from a user to set and/or select one or more functions supported by the management server 200 (e.g., plug-in functions, workform generation functions, etc.). The user interface 220 may include one or more of, for example, a keyboard, a keypad, a touch screen, a mouse, and/or a display device to receive input from the user.

More specifically, the user interface 220 may receive a plug-in corresponding to a job in sequence in order to generate a workform, which defines a job performing order of the image forming apparatus 110. The user interface 220 may receive an execution start condition for each plug-in.

The plug-in can include at least one of an input plug-in, a conversion plug-in, and a transmission plug-in, and/or any suitable plug-in to carry out the exemplary embodiments of the present general inventive concept disclosed herein.

The input plug-in can include at least one of a scan plug-in, a fax plug-in, an email plug-in, a folder plug-in, and an FTP plug-in. The conversion plug-in can include an OCR (optical character recognition) plug-in, and the transmission plug-in can include at least one of an email plug-in, an FTP plug-in, a PCFAX plug-in, a folder plug-in, a printer plug-in, and a database plug-in.

The user interface window displayed by the user interface 220 can include a first region (e.g., first region 310 illustrated in FIG. 3) to display a list containing a plurality of plug-ins and a second region (e.g., second region 320 illustrated in FIG. 3) to display a plug-in selected from among the plurality of plug-ins. That is, the user may select a plug-in on the first region according to a job order as the user wishes to perform, and the second region may hierarchically display the selected plug-ins according to the order selected through the first region or the job performing order. Accordingly, the second region may display the workform prepared by the user.

The user interface window may further include a third region (e.g., third region 330 illustrated in FIG. 3) to receive an execution start condition for the selected plug-in. That is, the user can impose and/or set an execution start condition on the selected plug-in so that the job order can be controlled without having to separately define a condition script for making the job order branch. The user interface window will be explained in detail with reference to FIGS. 3 to 9.

The user interface 220 may be a device to input and output (e.g., simultaneously input and out) such as a touch pad, or may be an input device such as a mouse and a keyboard, as well as a display device such as a CRT monitor, an LCD monitor, and an LED monitor.

The storage unit 230 can store one or more programs and data to drive the management server (for example, a workform management solution to prepare a workform). The storage unit 230 may be a hard disc drive (HDD), a solid state drive (SSD), and/or a memory (e.g., a non-volatile memory, a volatile memory, a flash memory, etc.).

The storage unit 230 may store the workform which is prepared using the user interface 220.

The storage unit 230 may be an embedded storage element or a removable storage element.

The workform generator 240 can generate a workform based on the plug-in and the execution start condition input received through the user interface 220. The workform generator 240 may be an integrated circuit, a processor, a controller, a field programmable gate array, a programmable logic device, and/or any suitable hardware and/or software to generate a workform in accordance with the exemplary embodiments of the present general inventive concept as disclosed herein.

More specifically, the workform generator 240 may generate the workform by selecting a plug-in on the first region according to the job order desired by the user through the user interface 220 and setting and/or imposing an execution start condition on the selected plug-in through the third region (e.g., the third region 330 of user interface window 300 illustrated in FIG. 3).

The controller 260 can control the communication interface 210, the user interface 220, the storage unit 230, and the workform generator 240. The controller 260 may be an integrated circuit, a processor, a controller, a field programmable gate array, a programmable logic device, and/or any suitable controller to carry out the exemplary embodiments of the present general inventive concept as disclosed herein.

More specifically, the controller 260 may perform a job corresponding to the workform generated based on the execution information of the workform received through the communication interface 210.

The controller 260 can compare the execution start condition set in a plug-in of the generated workform and the received execution information, and, if the execution information is matched with the execution start condition, the controller 260 controls one or more operations of the management server 200 to perform a job corresponding to the plug-in.

More specifically, if the received execution information is IP information of the information of the image forming apparatus, and IP information of the image forming apparatus is set in a plug-in of the workform as an execution start condition, the controller 260 can determine whether the execution information is matched with the execution start condition. If the execution information is matched with the execution start condition, the controller 260 can control one or more operations of the management server 200 perform a job corresponding to the plug-in.

If the received execution information is meta data information of the information of the workform performed in the image forming apparatus, and meta data is set in a plug-in of the workform as an execution start condition, the controller 260 can determine whether that the execution information is matched with the execution start condition. If the execution information is matched with the execution start condition, the controller 260 controls one or more operations of the management server 200 to perform a job corresponding to the plug-in.

If the received execution information is information obtained from a previously executed plug-in, and information obtained from a previously executed plug-in is set in a plug-in of the workform as an execution start condition, the controller 260 can determine whether the execution information is matched with the execution start condition. If the execution information is matched with the execution start condition, the controller 260 can control one or more operations of the management server 200 to perform a job corresponding to the plug-in. For example, if the workform includes a fax plug-in and a print plug-in, and an execution start condition that the print plug-in is performed only if the fax plug-in is performed, where the execution start condition is imposed on the print plug-in, the print plug-in is controlled by the controller 260 to be performed only if the fax plug-in is performed.

If the execution information is not matched with the execution start condition as determined by comparing the received execution information and the execution start condition set in the plug-in of the generated workform, the controller 260 may control the management server 200 so as not to perform the job corresponding to the plug-in.

If the execution start condition is not imposed on the plug-in of the generated workform, the controller 260 may control to perform the job corresponding to the plug-in without comparing the execution information and the execution start condition. However, this should not be considered as limiting. If the execution start condition is not imposed on the plug-in of the generated workform, the controller 260 may control the management server 200 so as not to perform the job corresponding to the plug-in.

FIGS. 3 to 9 are views illustrating user interface windows to manage a workform according to exemplary embodiments of the present general inventive concept. Hereinafter, a method of managing a workform according to exemplary embodiments of the present general inventive concept will be explained in detail with reference to FIGS. 3 to 9.

The following explanation is provided on the assumption that the user works for an agency of a mobile telecommunications operator and is in charge of communication opening (e.g., the user may establish new mobile telecommunications service accounts for new service subscribers). The user can scan an identification card and an application form when (e.g., one or more times, every time, etc.) a mobile telecommunications service is subscribed, and can fax and/or electronically transmit (e.g., via electronic mail) the scanned identification card and the application form to the telecommunications operator, while printing them. The user can scan at least one of the application forms (e.g., all of the application forms) and a product release register (e.g., when finishing his/her work) and can separately store them in an "application form" table and a "product release register" table of a database of the telecommunications operator.

A workform in which a plug-in execution start condition is set can be generated. In the workform, the input plug-in can be set to a scan plug-in, the conversion plug-in can be set to an OCR plug-in, and the transmission plug-in can be set to fax, printer, and database plug-ins. Meta data can be set to receive a job type from the user as information that may be included in the plug-in execution start condition. The meta data may be used because information in the workform may be utilized for the execution start condition. The meta data can be information that is selected by the user through the image forming apparatus and can be transmitted to a document sending solution server (e.g., the management server 130 illustrated in FIG. 1) along with the workform. A plug-in execution start condition may include the meta data information.

Referring to FIG. 3, a user interface window 300 can include a first region 310 to display a list containing a plurality of plug-ins, a second region 320 to display a plug-in selected from among the plurality of plug-ins, a third region 330 to prepare a new workform, and a fourth region 340 relating to storage of a workform. For example, as illustrated in FIG. 3, the first region 310 may have a list of plug-ins, including input plug-ins (e.g., scan, fax, email, folder, and FTP (file transfer protocol), conversion plug-ins (e.g., OCR (optical character recognition), and transmission plug-ins (e.g., email FTP, fax (PCFax, Windows Fax), folder, print, and database). The third region 330 can be selected so that a user can input an execution start condition for plug-ins selected from the first region 310 to form a job order in the second region 320. The fourth region 340 may be selected so as to store the job order formed in the second region 320 of the workform.

More specifically, the user may generate a workform using the user interface window 300 of the management server (e.g., the management server 130 illustrated in FIG. 1 and/or the management server 200 illustrated in FIG. 2). That is, the user may select a plug-in from the first region 310 which displays the list of plug-ins according to a job order as the user wishes to perform, and the second region 320 may hierarchically display the selected plug-ins according to the order selected in the first region 310 or by a job performing order. Accordingly, the workform prepared by the user can be displayed in the second region 320.

Referring to FIG. 3, the scan plug-in can be selected as the input plug-in, the OCR plug-in can be selected as the conversion plug-in, and fax, printer, and database plug-ins can be selected as the transmission plug-in, where the plug-ins are selected from first region 310 illustrated in FIG. 3. As illustrated in the second region 320 of FIG. 3, the jobs can be arranged sequentially in order of scan, OCR, fax, printer, and database.

FIG. 4 is a view illustrating a user interface window 300 to set meta data to be utilized as information of an execution start condition of each plug-in when generating a workform according to exemplary embodiments of the present general inventive concept. The meta data can be information that is selected by the user through the image forming apparatus (e.g., the image forming apparatus 110 illustrated in FIG. 1), can be transmitted to a document sending solution server along with a workform, and can be utilized in the plug-in execution start condition. Referring to FIG. 4, when "scan" is selected from the second region 320, "scan metadata" can be selected from a list including, for example, scan metadata, fax, email, folder, FTP and delete. When "scan metadata" is selected by the user, a workflow dialog box 322 can be displayed in the user interface window 300. "Work" can be selected as a name of meta data, and "application form" can be selected as a value for the selected meta data. When "application form" is selected from the drop-down menu selection in workflow dialog box 322, the modify metadata dialog box 323 may be displayed in the user interface window 300. The modify metadata dialog box 323 may include the metadata name (e.g., 'work', as illustrated in FIG. 4), new values may be added, and the value list (e.g., 'application form', 'finish work', etc.) may be displayed.

Figure 5:
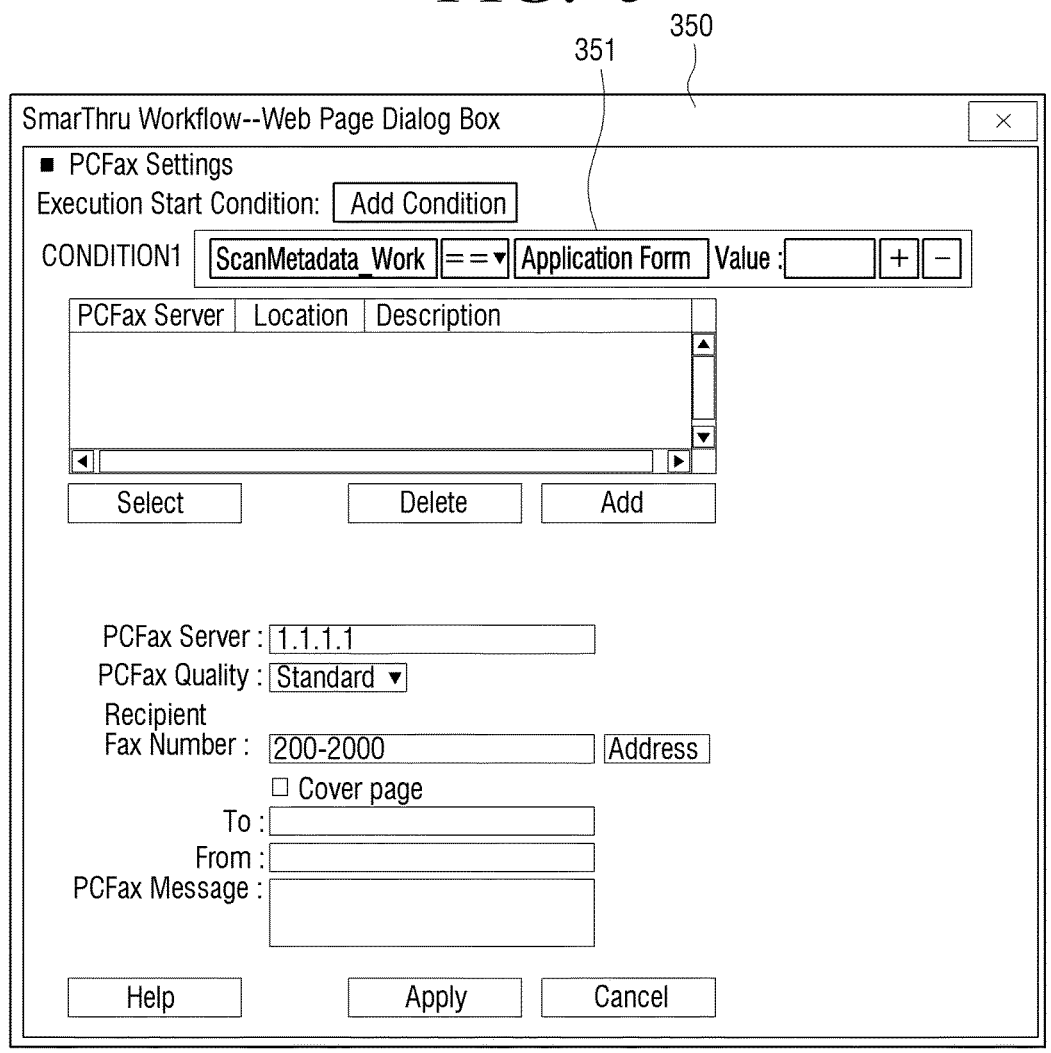

FIG. 5 is a view illustrating a user interface window relating to setting an execution start condition of a fax plug-in (e.g., a fax plug-in selected from the first region 310 illustrated in FIGS. 3-4 or the workflow dialog box 322 illustrated in FIG. 4) according to exemplary embodiments of the present general inventive concept. Referring to FIG. 5, user interface windows 350 and 351 can be displayed for a user, and can receive an execution start condition (e.g., that is input by a user).

In this example, faxing may be executed only if the "application form" is selected from the "work" item of the meta data on the image forming apparatus (e.g., image forming apparatus 110 illustrated in FIG. 1). That is, faxing may be executed when the "application form" is selected from the "ScanMetadata_Work" item (i.e., the "work" item) as illustrated in interface window 351. Accordingly, the execution start condition may be set as illustrated in FIG. 5.

Figure 6:
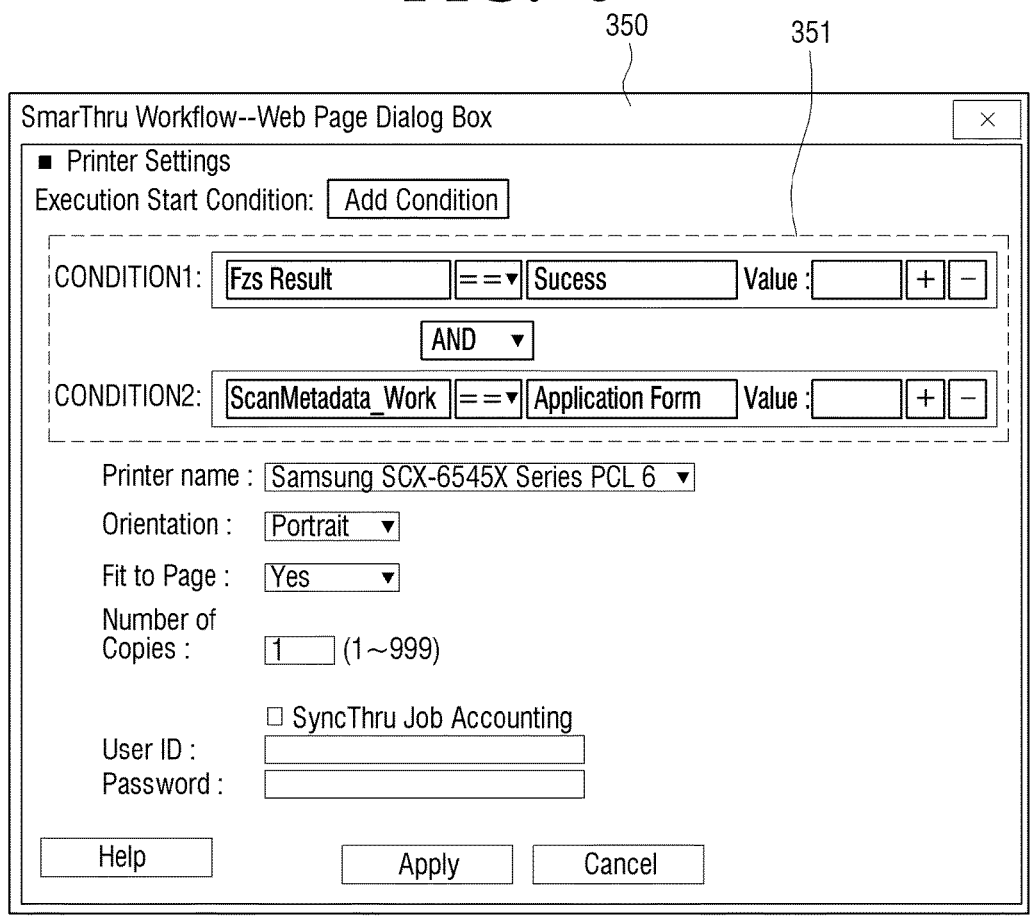

FIG. 6 is a view illustrating a user interface window 350 that includes interface window 351 to set an execution start condition of a print plug-in according to exemplary embodiments of the present general inventive concept. In this example, the print plug-in is executed only if the previously executed fax plug-in succeeds. That is, as illustrated in interface window 351 of FIG. 6, "CONDITION1" may be set such that "FZs Result" equals "Success," and thus the print plug-in is executed when the previously executed fax plug-in succeeds. The print plug-in may be executed only if the user selects the "application form" from the "work" item of the meta data on the image forming apparatus. Interface window 351 of FIG. 6 illustrates a "CONDITION2" that is set such that "ScanMetadata_Work" equals "Application Form," where the "work" item is "ScanMetadata_Work" and the "Application Form" is selected. That is, when the "Application Form" is selected from the "ScanMetadata_Work" item, the print plug-in may be executed. The setting of "CONDITION1" and "CONDITION 2" in the interface window 351 is such that the print plug-in (e.g., as set by "CONDITION2") is executed only if the previously executed fax plug-in (e.g., as set by "CONDITION1") succeeds. Accordingly, the execution start condition can be set as illustrated in FIG. 6.

FIG. 7 is a view illustrating a user interface window 350 including an interface window 351 to set an execution start condition to send the application form or the product release register to the "application form" table or the "product release register" table of the database of the telecommunications operator and set information necessary for execution according to exemplary embodiments of the present general inventive concept. That is, interface window 351 can set a "CONDITION2", where a "SourceFile data" can be sent to a "Product Release Register" or to an "Application Form." The database plug-in can be executed only if the user selects "finish work" from the "work" item of the meta data on the image forming apparatus and there are words "application form" or "product release register" in a document input through the OCR plug-in. That is, the database plug-in can be executed when, as illustrated in the interface window 351, "CONDITION1" is set such that the "ScanMetadata_Work" is set to "Finish Work," and "Product Release Register" or "Application form" is included in the "SourceFile data." The table name of the data base (e.g., the "Database & Table" information 352 as illustrated in interface window 350 of FIG. 7) can be determined at least in part by "CONDITION2" as set in interface window 351, and a file can be stored in a table having the same name as a value set in condition 'True' (e.g., in setting 353 illustrated in FIG. 7, where "2_Value" is "True") of two conditions of "CONDITION2". That is, the file can be store in a table when the interface window 351 includes two conditions set for "CONDITION2." Accordingly, the plug-in execution information and the execution start condition can be set as illustrated in FIG. 7.

Figure 8:
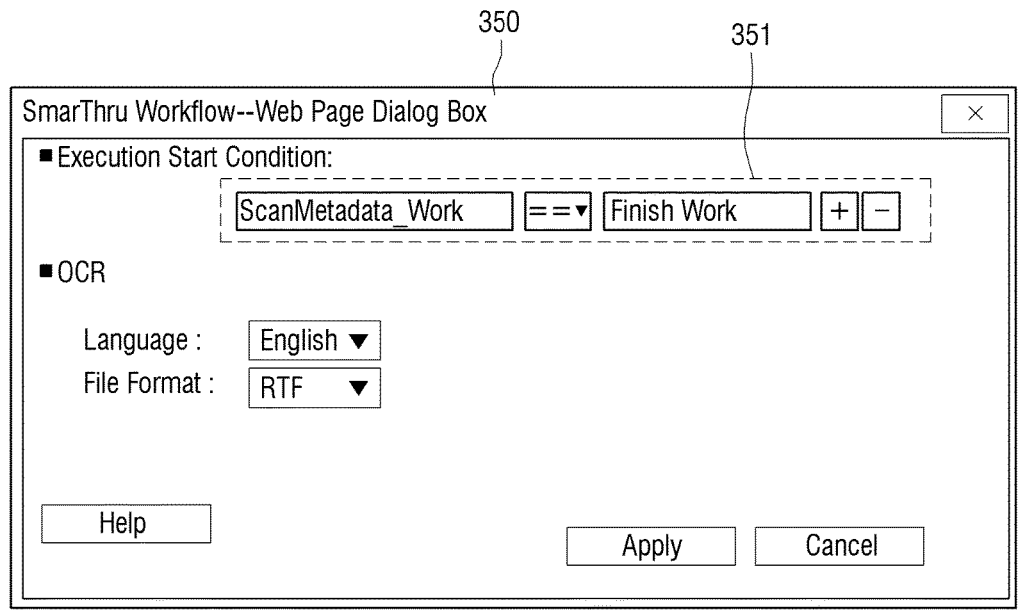

FIG. 8 is a view illustrating a user interface window 350 including an interface window 351 to set an execution start condition of an OCR plug-in according to exemplary embodiments of the present general inventive concept. The OCR plug-in can be selected in from the at least one of the first region 310 and/or the second region 320 illustrated in FIGS. 3 and 4. For example, the OCR plug-in may be executed only if the user selects the "finish work" from the "work" item of the metadata. As illustrated in interface window 351 of FIG. 8, the execution start condition of the OCR plug-in may be set such that the start condition may be executed when "Finish Work" is selected from the "work" item (i.e., "ScanMetadata_Work"). That is, when the execution start condition is set in the interface window 351 such that "ScanMetadata_Work" is equal to "Finish Work, the OCR plug-in can be executed when this set condition occurs. Accordingly, the execution start condition for the OCR plug-in may be set as illustrated in FIG. 8.

Figure 9:
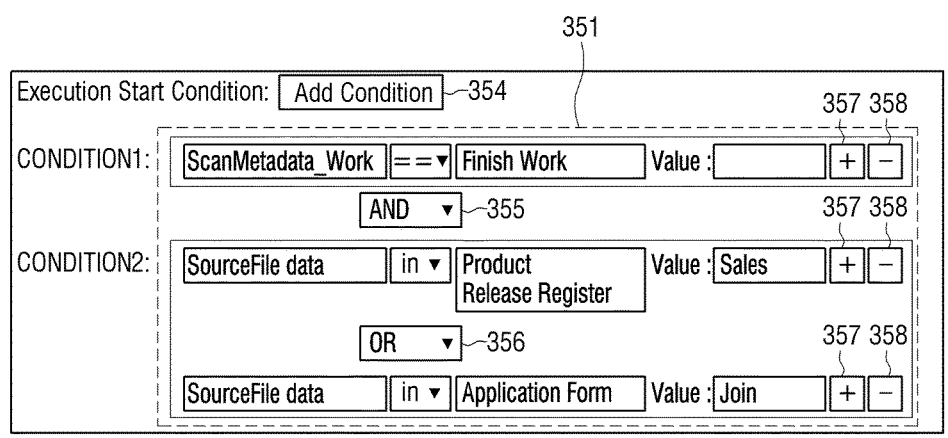

FIG. 9 is a view illustrating a user interface window 351 to set an execution start condition according to exemplary embodiments of the present general inventive concept. The execution start condition may be set for every plug-in. The user interface window 351 illustrated in FIG. 9 may set an execution start condition for a database plug-in.

The user interface window 351 is provided such that one execution start condition is input (e.g., "CONDITION1" as illustrated in FIG. 9), unless specification instructions are given (e.g., so as to set "CONDITION1" and "CONDITION2" as illustrated in FIG. 9, where "CONDITION2" may have one or more conditions). If the user wishes to input more than one condition, the user can add condition 2 (i.e., "CONDITION2" illustrated in FIG. 9) by selecting a start condition add button (e.g., the "Add Condition" button 354 illustrated in FIG. 9). If the user wishes to satisfy both condition 1 and condition 2, the user selects an AND operation (e.g., selects "AND" from the drop-down menu 355). If the user wishes to set the plug-in to be performed if only one of the two conditions is satisfied, the user selects an OR operation (e.g., selects "OR" from the drop-down menu 355 and/or from drop down menu 356). For example, as illustrated in FIG. 9, the start condition of "CONDITION 1" may be executed when "Finish Work" is selected from the "work" item (i.e., "ScanMetadata_Work"), the "AND" may be selected so as to include the "CONDITION2" to the start condition, where "SourceFile data" may be in a "Product Release Register" or in an "Application Form."

In one condition, an additional condition may be set or deleted as in condition 2. A sub-condition may be added using a plus (+) button (e.g., plus button 357 illustrated in FIG. 9) and may be deleted using a minus (−) button (e.g., minus button 358). The relationship of the sub-conditions may be set according to the AND and OR operations. Each condition has a value, and, if the OR operation is used as explained below, a value of a condition of the two conditions that is satisfied may be internally utilized.

However, the above-described condition may not be input. That is, a user may not set an execution start condition with the interface window 351.

In the case of a related art system, in order to illustrate the above-described example, three types of workforms such as Scan to Fax & Printer, Scan to Database (application form), and Scan to Database (product release register) are required and a workform suitable for a current job should be selected from among the three types of workforms prior to execution. However, if the workform in which the execution start condition of the plug-in is set is used as illustrated in FIGS. 3 to 9, the user can perform "subscribing" and "finish work" through a single workform without having to discriminate between the workforms, and the user does not have to write a control script to control the job order.

Figure 10:
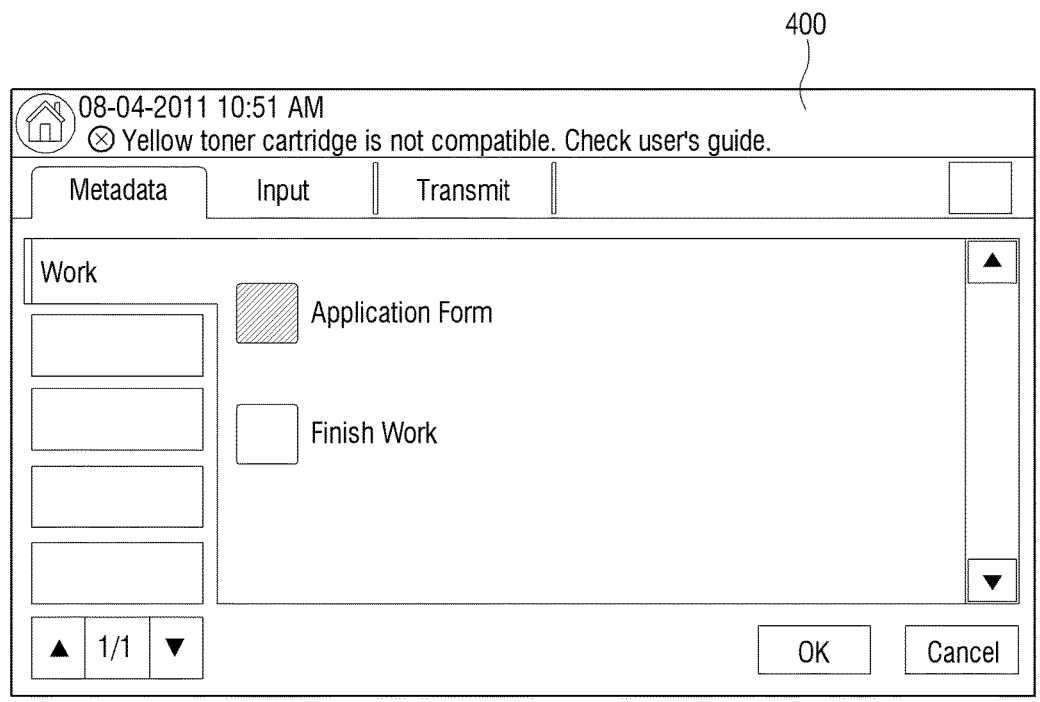
FIGS. 10 to 12 are views illustrating user interface windows to select a workform in an image forming apparatus according to exemplary embodiments of the present general inventive concept.
Figure 11:
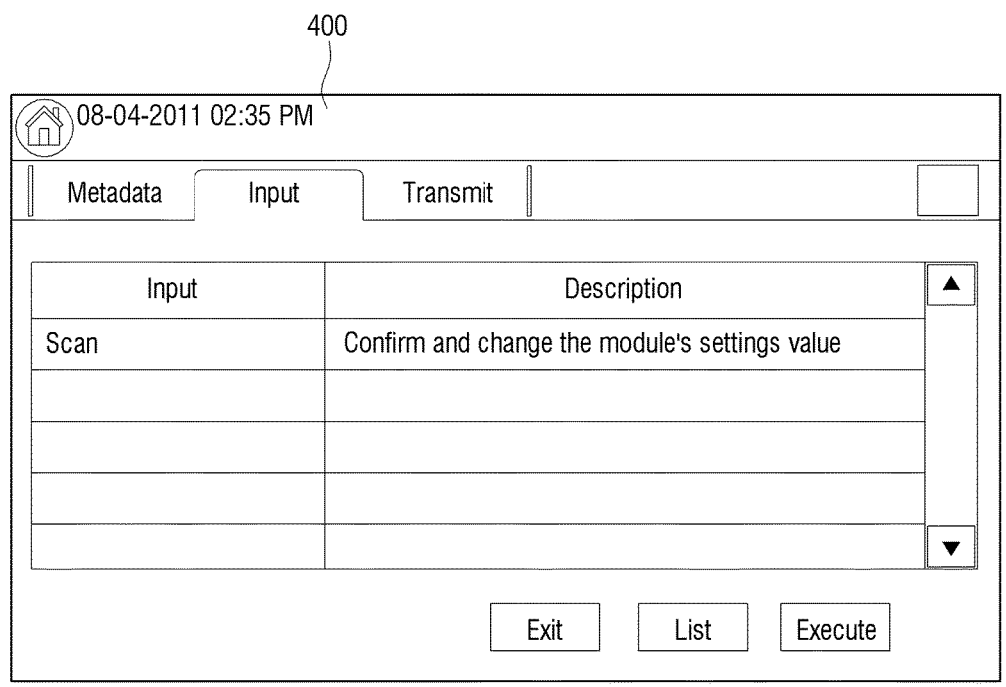
Figure 12:
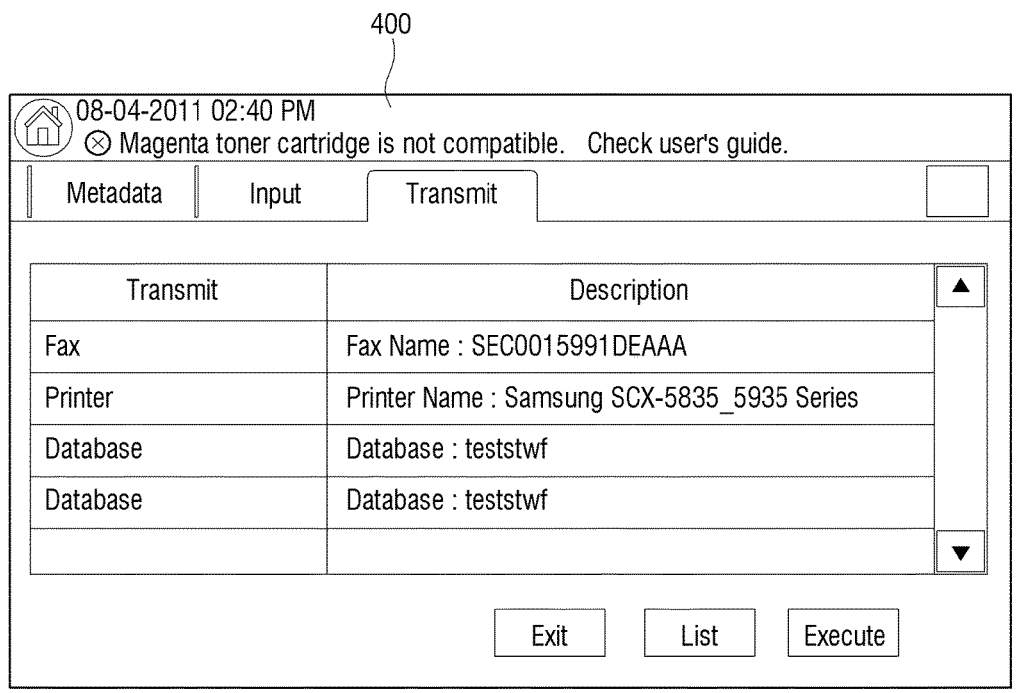

FIGS. 10 to 12 are views illustrating user interface windows 400 to select a workform in an image forming apparatus according to exemplary embodiments of the present general inventive concept. For convenience of explanation, the same situation as in FIGS. 3 to 9 is assumed.

Referring to FIG. 10, when the user is to fax and/or electronically transmit the application form to the telecommunications operator in order to receive approval and output it through a printer, the user has an opportunity to place the ID card and the application form of the subscriber on a flat panel scanner and select a workform (e.g., "Application Form" and "Finish Work" as illustrated in FIG. 10) and meta data (e.g., the "Metadata" tab of the user interface 400, which includes tabs for "Metadata", "Input", and "Transmit"). The user can select "application form" from the user interface window 400.

If the "application form" is selected, the scan plug-in can be executed, and the image forming apparatus (e.g., image forming apparatus 110 as illustrated in FIG. 1) can perform a scanning operation. The controller can determine whether to execute the next operation, which is the OCR plug-in. The controller (e.g., the controller 260 illustrated in FIG. 2) can compare the execution information received at the image forming apparatus ("application form" in FIG. 10) and the execution start condition of the OCR plug-in. When the user selects the "application form" as meta data, the meta data is not matched with the execution start condition of the OCR plug-in, "finish work". Therefore, the corresponding plug-in is not executed. The controller (e.g., the controller 260 illustrated in FIG. 2) can compare the execution information and the fax plug-in. When the user selects the "application form" as meta data, which satisfies the execution start condition of the fax plug-in, the fax plug-in can be executed and thus a document can be scanned by the image forming apparatus (e.g., the image forming apparatus 110 illustrated in FIG. 1) using the scan plug-in is faxed to the telecommunications operator. The controller (e.g., the controller 260 illustrated in FIG. 2) can compare the execution information and the printer plug-in. Since the meta data is the "application form" and a result of the fax plug-in is successful, the execution start condition of the printer plug-in is satisfied and thus the scanned document can be printed.

The controller (e.g., controller 260 illustrated in FIG. 2) can compare the execution information and the database plug-in. Since the meta data is the "application form", which does not satisfy the execution start condition of the database plug-in, the corresponding plug-in is not executed and the corresponding job is finished.

The user may have to list one or more application forms (e.g., all application forms) submitted for a predetermined and/or selected period of time (e.g., for a day) and a product release list, and transmit them to the database of the telecommunications operator. Each document can be stored in one or more specific tables of the database of the telecommunications operator.

That is, the user may scan one or more application forms (e.g., all of the application forms) and the product release list, and can transmit the application forms to a table 'Join' and the product release list to a table 'Sales'.

The user can scan the application forms and the product release list, and can select the generated workform (e.g., "finish work" as illustrated in the user interface window 400 of FIG. 10).

If "finish work" is selected from the user interface window 400, the scan plug-in can be executed and thus the image forming apparatus (e.g., image forming apparatus 110 illustrated in FIG. 1) can perform scanning. The controller (e.g., controller 260) can determine whether to execute the OCR plug-in. The controller can compare the execution information received at the image forming apparatus and the execution start condition of the OCR plug-in. When the user selects the 'finish work' as meta data from the user interface window 400, which satisfies the execution start condition of the OCR plug-in (see, e.g., the execution start condition that is set in the interface window 351 of FIG. 8), the controller can perform OCR processing operations on the input document.

The controller (e.g., controller 260 illustrated in FIG. 2) can determine whether to execute the fax plug-in and the printer plug-in. Since the value of the meta data selected by the user is the 'finish work', which does not satisfy the execution start condition, the controller does not execute the two plug-ins. That is, the execution start condition of the fax plug-in is illustrated in interface window 351 of FIG. 5, which is set to "Application Form," and is not set to "Finish Work." Referring to interface window 351 of FIG. 6, neither of the execution start conditions of the print plug-in are set to "Finish Work." Thus, the value of the meta data selected by the user (i.e., "Finish Work") does not satisfy the execution start conditions for the fax plug-in and the printer plug-in, and the controller does not execute the plug-ins. The controller can determine whether to execute the database plug-in (e.g., using the execution start conditions of the database plug-ins that are set in the user interface window 351 as illustrated in FIG. 9). Since the scan metadata is the "finish work", condition 1 can be satisfied, as the "CONDITION1" illustrated in interface window 351 of FIG. 9 may be executed when "ScanMetadata_Work" equals "Finish Work". When the input document OCR-processed in condition 2 contains the words "application form" (e.g., where the "SourceFile data" is in the "Application Form" as set in "CONDITION2" of interface window 351 of FIG. 9), the controller can transmit the document to the table 'Join' of the database of the telecommunications operator, and, when the document contains words "product release register" (e.g., where the "SourceFile data" is in the "Product Release Register" as set in "CONDITION2" of interface window 351 of FIG. 9), the controller can transmit the document to the table 'Sales'. When all of the input documents have been processed, the corresponding jobs may be finished.

FIG. 11 is a view illustrating a user interface window 400 relating to an input plug-in of a workform transmitted from the management server according to exemplary embodiments of the present general inventive concept. Since the scan plug-in is set as the input plug-in in the above example described in connection with FIG. 10, the scan plug-in is set as the input plug-in in FIG. 11. That is, the user may select the "Input" tab of the user interface 400 (e.g., from the "Metadata", "Input", and "Transmit" tabs), and set the scan plug-in as the input plug-in.

FIG. 12 is a view illustrating a user interface window relating to a transmission plug-in of a workform transmitted from the management server according to exemplary embodiments of the present general inventive concept. Since the fax plug-in, the printer plug-in, and the database plug-in are set as the transmission plug-in in the above example (see, e.g., second region 320 of FIG. 3, that includes "PCFax," "Printer", and "Database" plug-ins, as well as FIG. 5 for the fax plug-in, FIG. 6 for the print plug-in, and FIG. 8 for the database plug-in), the transmission plug-in can be displayed as illustrated in the user interface window 400 of FIG. 12. For example, the transmission plug-in information that is displayed in the user interface window 400 can include a fax name and description, a printer name and description, as well as a least one database name and description. The transmission plug-in can be executed by selecting the "execute" button displayed in the illustrated in the user interface window 400.

The user may correct and/or edit the workform based on pre-stored function information. For example, the user can add and/or remove plug-ins, or edit one or more parameters of the plug-ins, with the user interface window 400 and one or more pre-stored function information.

Figure 13:
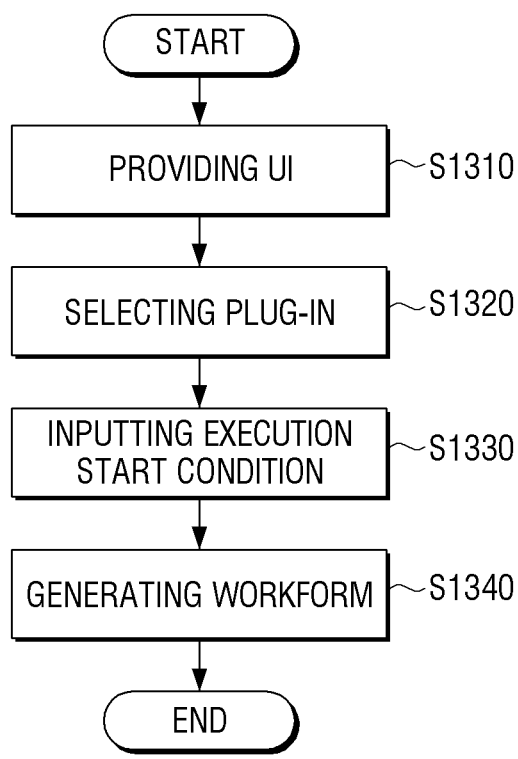
FIGS. 13 and 14 are flowcharts illustrating a method of managing a workform according to an exemplary embodiment.

FIG. 13 is a flowchart illustrating a method of generating a workform according to exemplary embodiments of the present general inventive concept. Referring to FIG. 13, a user interface window to generate a workform defining a job performing order of the image forming apparatus can be provided at operation S1310.

Through the user interface window, a plug-in corresponding to each job can be selected in a sequence according to a job performing order at operation S1320. A user interface window can receive an execution start condition for each of the selected plug-ins is displayed at operation S1330. A workform can be generated according to the selected plug-in and the input execution start condition at operation S1340. The method of generating the workform has been described above with reference to FIGS. 3 to 9 and thus a detailed description is omitted.

Figure 14:
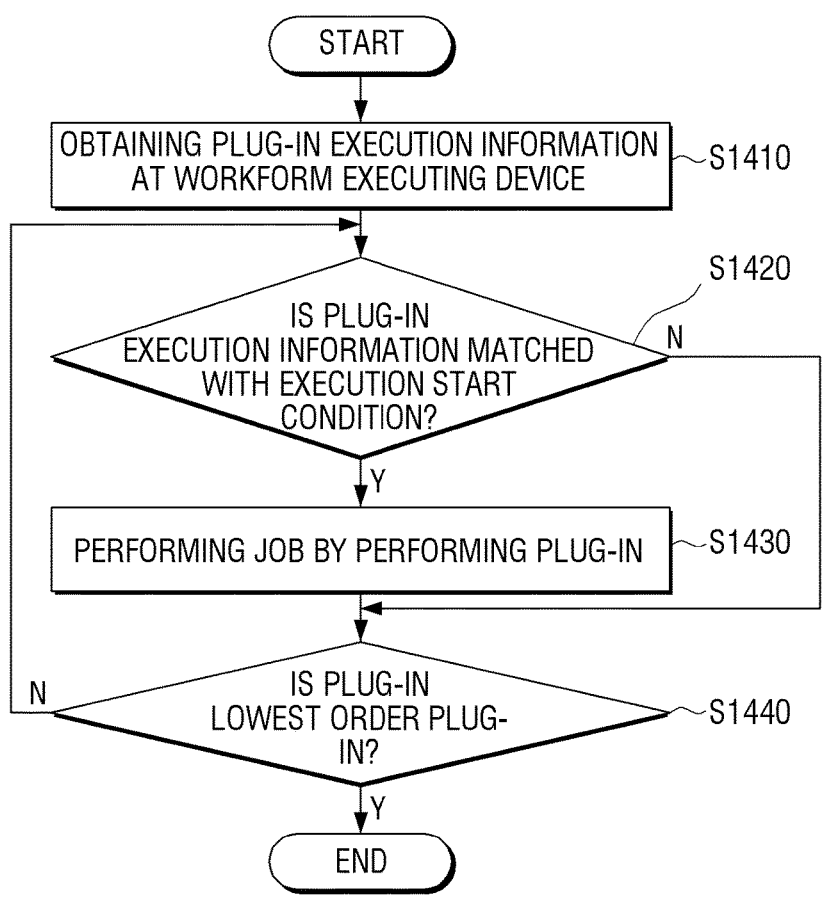

FIG. 14 is a flowchart illustrating a method of executing a workform according to exemplary embodiments of the present general inventive concept. Referring to FIG. 14, execution information can be received by the image forming apparatus (e.g., image forming apparatus 110 illustrated in FIG. 1) at operation S1410. Operation S1420 can determine whether the received execution information is matched with an execution start condition of each plug-in. If the execution information is not matched with the execution start condition at operation S1420, it is determined whether the corresponding plug-in is the lowest order plug-in or not at operation S1440. If the plug-in is the lowest order plug-in at operation S1440, the method of executing the workform is completed, and if the plug-in is not the lowest order plug-in at operation S1440, it is determined whether the execution information is matched with an execution start condition of a next plug-in at operation S1420.

If the execution information is matched with the execution start condition at operation S1420, a job can be performed by performing the corresponding plug-in at operation S1430. Operation S1440 can determine whether the plug-in performing the job is the lowest order plug-in. If the plug-in is the lowest order plug-in at operation S1440, the method of executing the workform is completed. If the plug-in is not the lowest order plug-in at operation S1440, it is determined whether the execution information is matched with am execution start condition of a next plug-in at operation S1420.

The method of managing the workform according to the above-described exemplary embodiments may be realized as a program code and may be stored in various types of recording media. More specifically, the method may be stored in various types of recording media readable by a terminal, such as a random access memory (RAM), a flash memory, a read only memory (ROM), an erasable programmable ROM (EPROM), an electronically erasable and programmable ROM (EEPROM), a register, a hard disk, a removable disk, a memory card, a USB memory, and a CD-ROM.

Accordingly, the program may be installed in a device to which the recording medium is connected or on which the recording medium is mounted in order to execute the method of managing the workform.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

According to the above-described exemplary embodiments, the user or the administrator can easily manage the workform using the workform consisting of the plug-ins, without having to control or select the workform separately in every job.

Although various example embodiments of the present general inventive concept have been illustrated and described, it will be appreciated by those skilled in the art that changes may be made in these example embodiments without departing from the principles and spirit of the general inventive concept, the scope of which is defined in the appended claims and their equivalents.

What is claimed is:

1. A management server communicatively connectable to an image forming apparatus, the management server comprising:
a user interface to:
receive a plurality of selections of plug-ins, from among a list of plug-ins, each plug-in from among the plug-ins corresponding to a job from among a plurality of jobs performable by the image forming apparatus, and
receive at least one selection of at least one execution condition to control execution of a plug-in corresponding to a job;
a controller to generate a workform including the plug-ins and an order of the plurality of jobs to be performed based on the at least one execution condition by the image forming apparatus; and
a communication interface to:
transmit the generated workform to the image forming apparatus, and
receive execution information regarding executing the transmitted workform by the image forming apparatus, from the image forming apparatus receiving the transmitted workform;
wherein the controller is to, in response to the communication interface receiving the execution information, perform the plurality of jobs included in the generated workform and corresponding to the plug-ins in the order of the plurality of jobs and based on the at least one execution condition, in response to a determination that the received execution information matches with the at least one execution condition to control execution of the plug-in.

2. The management server as claimed in claim 1, wherein the controller is to perform the plurality of jobs included in the generated workform and corresponding to the plug-ins in the order of the plurality of jobs further based on the execution information regarding executing the transmitted workform.

3. The management server as claimed in claim 2, wherein the execution information comprises at least one of:
information of the image forming apparatus,
information of the generated workform performed by the image forming apparatus, or
resulting information of a job performed by the image forming apparatus.

4. The management server as claimed in claim 1, wherein the plug-ins is at least one of an input plug-in, a conversion plug-in, or a transmission plug-in.

5. The management server as claimed in claim 4, wherein:
the input plug-in comprises at least one of a scan plug-in, a fax plug-in, an email plug-in, a folder plug-in, or a file transfer protocol (FTP) plug-in,
the conversion plug-in comprises an optical character recognition (OCR) plug-in, and
the transmission plug-in comprises at least one of an email plug-in, an FTP plug-in, a PCFAX plug-in, a folder plug-in, a printer plug-in, or a database plug-in.

6. The management server as claimed in claim 1, further comprising:
a storage unit to store the generated workform.

7. The management server as claimed in claim 1, wherein:
the user interface displays a user interface window comprising a first region to display the list of plug-ins and a second region to display the plug-ins selected from among the list of plug-ins, and
the second region hierarchically displays the plug-ins according to the order of the plurality of jobs to be performed.

8. A method of managing a workform of a management server which is communicatively connectable to an image forming apparatus, the method comprising:
displaying a user interface window to:
receive a plurality of selections of plug-ins, from among a list of plug-ins, each plug-in from among the plug-ins corresponding to a job from among a plurality of jobs performable by the image forming apparatus, and
receive at least one selection of at least one execution condition to control execution of a plug-in corresponding to a job;
generating a workform including the plug-ins and an order of the plurality of jobs to be performed based on the at least one execution condition by the image forming apparatus;
transmitting the generated workform to the image forming apparatus;
receiving execution information regarding executing the transmitted workform by the image forming apparatus, from the image forming apparatus receiving the transmitted workform; and
in response to the receiving the execution information, performing the plurality of jobs included in the generated workform and corresponding to the plug-ins in the order of the plurality of jobs and based on the at least one execution condition to control execution of the plug-in.

9. The method as claimed in claim 8, wherein the execution information comprises at least one of:
information of the image forming apparatus,
information of the generated workform performed by the image forming apparatus, or
resulting information of the order of jobs performed by the image forming apparatus.

10. The method as claimed in claim 8, wherein the plug-ins is at least one of an input plug-in, a conversion plug-in, and a transmission plug-in.

11. The method as claimed in claim 10, wherein:
the plug-ins comprises at least one of a scan plug-in, a fax plug-in, an email plug-in, a folder plug-in, or an FTP plug-in,
the conversion plug-in comprises an OCR plug-in, and
the transmission plug-in comprises at least one of an email plug-in, an FTP plug-in, a PCFAX plug-in, a folder plug-in, a printer plug-in, or a database plug-in.

12. The method as claimed in claim 8, wherein:
the displaying the user interface window comprises:
displaying a first region including the list of plug-ins;
displaying a second region including the plug-ins selected from among the list of plug-ins; and
displaying a third region to receive the at least one selection of the at least one execution condition to control the plug-in corresponding to the job among the plug-ins respectively corresponding to the plurality of jobs; and
the displaying the second region comprises:
hierarchically displaying the plug-ins according to an order of the selections of the plug-ins or the order of the plurality of jobs.

13. A non-transitory recording medium in which a program code to perform a method of managing a workform of a management server communicatively connectable to an image forming apparatus is stored, the method of managing the workform comprising:
displaying a user interface window to:
receive a plurality of selections of plug-ins, from among a list of plug-ins, each plug-in from among the plug-ins corresponding to a job from among a plurality of jobs performable by the image forming apparatus, and
receive at least one selection of at least one execution condition to control execution of a plug-in corresponding to a job;
generating a workform including the plug-ins and an order of the plurality of jobs to be performed based on the at least one execution condition by the image forming apparatus;
transmitting the generated workform to the image forming apparatus;
receiving execution information regarding executing the transmitted workform by the image forming apparatus, from the image forming apparatus receiving the transmitted workform; and
in response to the receiving the execution information, performing the plurality of jobs included in the generated workform and corresponding to the plug-ins in the order of the plurality of jobs and based on the at least one execution condition to control execution of the plug-in.

14. The non-transitory recording medium of claim 13, wherein displaying the user interface window comprises:
displaying a first region including the list of plug-ins;
displaying a second region including the plurality of plug-ins selected from among the list of plug-ins; and
displaying a third region to receive the at least one selection of the at least one execution condition to control the plug-in corresponding to the job among the plurality of plug-ins respectively corresponding to the plurality of jobs.

15. The management server as claimed in claim 13, wherein
the execution information comprises at least one selected from:
information of the image forming apparatus,
information of the generated workform performed by the image forming apparatus, and
resulting information of the order of jobs performed by the image forming apparatus.

* * * * *